(12) United States Patent
Mrnuštik

(10) Patent No.: US 10,598,339 B2
(45) Date of Patent: Mar. 24, 2020

(54) OUTSIDE DOOR HANDLE AND MOTOR VEHICLE EQUIPPED WITH SAME

(71) Applicant: WITTE Automotive GmbH, Velbert (DE)

(72) Inventor: Lukáš Mrnuštik, Karlovy Vary (CZ)

(73) Assignee: WITTE Automotive GmbH, Velbert (DE)

( * ) Notice: Subject to any disclaimer, the term of this patent is extended or adjusted under 35 U.S.C. 154(b) by 0 days.

(21) Appl. No.: 16/136,991

(22) Filed: Sep. 20, 2018

(65) Prior Publication Data

US 2019/0093856 A1    Mar. 28, 2019

(30) Foreign Application Priority Data

Sep. 26, 2017    (DE) .................... 10 2017 122 348

(51) Int. Cl.
| | |
|---|---|
| *F21V 3/00* | (2015.01) |
| *F21V 5/00* | (2018.01) |
| *B60Q 3/267* | (2017.01) |
| *E05B 85/10* | (2014.01) |
| *E05B 17/10* | (2006.01) |
| *F21S 41/147* | (2018.01) |
| *F21S 41/20* | (2018.01) |

(Continued)

(52) U.S. Cl.
CPC .............. *F21V 5/002* (2013.01); *B60Q 1/24* (2013.01); *B60Q 1/2669* (2013.01); *B60Q 3/267* (2017.02); *E05B 17/10* (2013.01); *E05B 85/10* (2013.01); *E05B 85/16* (2013.01); *F21S 41/147* (2018.01); *F21S 41/285* (2018.01); *F21W 2102/40* (2018.01); *F21W 2107/10* (2018.01); *F21Y 2101/00* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2,308,844 A | * | 1/1943 | Wilshusen | B60Q 1/2669 362/540 |
| 6,070,998 A | * | 6/2000 | Jennings | B60Q 1/2669 362/100 |

(Continued)

FOREIGN PATENT DOCUMENTS

| | | |
|---|---|---|
| DE | 102016216384 B3 | 7/2017 |
| EP | 3071451 A1 | 9/2016 |

(Continued)

OTHER PUBLICATIONS

Official Communication from the European Patent Office for related European Application No. 18182160.4; dated Oct. 8, 2018; 3 pages.

(Continued)

*Primary Examiner* — Vip Patel
(74) *Attorney, Agent, or Firm* — Wiggin and Dana LLP; Gregory S. Rosenblatt

(57) ABSTRACT

An outside door handle, in particular for a motor vehicle, having a handle body comprising an outer contour, having a light source received by the handle body for a front area lighting and/or for a door handle cup lighting, and having a diffuser for scattering the light irradiated by the light source into diffuse light that is inwardly arranged in the handle body at a spacing from its outer contour.

24 Claims, 4 Drawing Sheets

(51) Int. Cl.
*B60Q 1/24* (2006.01)
*B60Q 1/26* (2006.01)
*E05B 85/16* (2014.01)
*F21Y 115/10* (2016.01)
*F21W 102/40* (2018.01)
*F21W 107/10* (2018.01)
*F21Y 101/00* (2016.01)

(56) References Cited

U.S. PATENT DOCUMENTS

| 2006/0232864 | A1 | 10/2006 | Tsai |
| 2010/0321945 | A1 | 12/2010 | Lang et al. |
| 2010/0321946 | A1 | 12/2010 | Dingman et al. |
| 2011/0017305 | A1* | 1/2011 | Williams, Jr. .......... B23P 11/00 137/1 |

FOREIGN PATENT DOCUMENTS

| WO | 2015075528 A1 | 5/2015 |
| WO | 2015150157 A1 | 10/2015 |

OTHER PUBLICATIONS

Official Communication from the German Patent Office for related German Application No. 102017122348.7 ; dated Jan. 12, 2018; 2 pages.

* cited by examiner

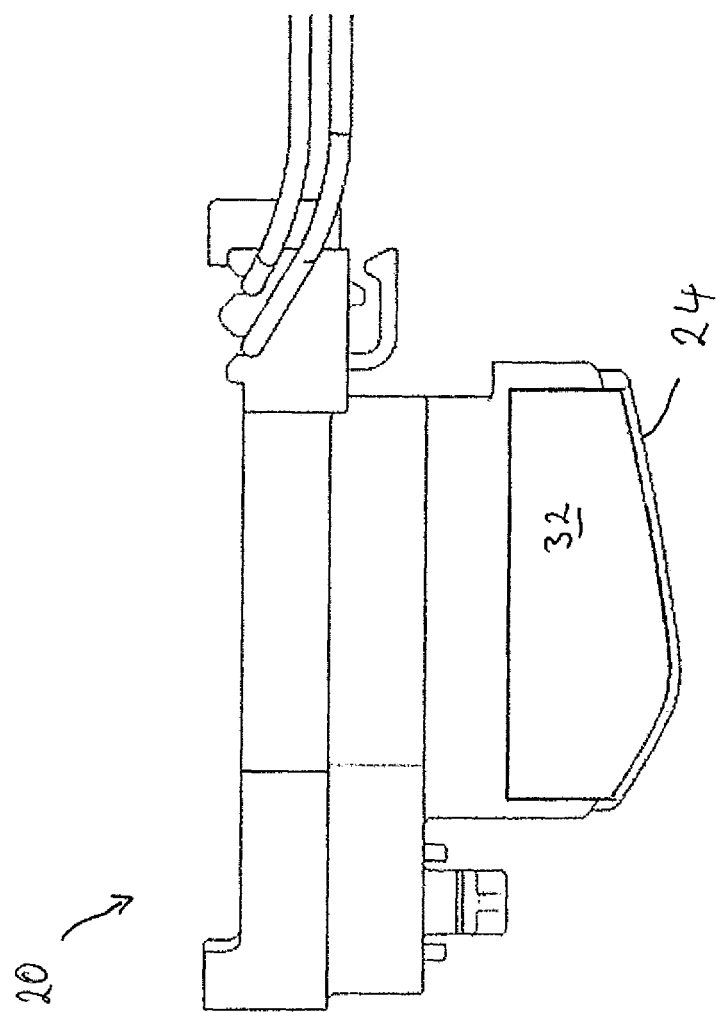

OUTSIDE DOOR HANDLE AND MOTOR VEHICLE EQUIPPED WITH SAME

The present invention relates to an outside door handle and to a motor vehicle equipped with such an outside door handle.

It is known to equip outside door handles for motor vehicles with a so-called front area lighting and/or door handle lighting. The front area lighting and/or door handle lighting contributes to an increase in the operating comfort in the dark in that it provides the illumination of a handle cup disposed being the outside door handle or the illumination of a ground area disposed in front of the vehicle. The light emitting surface of known outside door handles can be roughened for a homogeneous illumination both with respect to the intensity and the color of the emitted light. The light emitting surface can equally be formed by different optical components.

It is required by current legal provisions that light emitting surface of such lighting may no longer be perceived starting from a point of view at a distance from the motor vehicle of at least 10 m and from a height of at least 1 m above the ground below the vehicle. In the case of roughened light emitting surfaces or different optical components at the outer contour of the outside door handle, there is, however, the risk that the respective light emitting surfaces can be perceived from the present relevant range of view.

It is therefore the underlying object of the invention to provide an outside door handle in which a homogeneous illumination is made possible, on the one hand, and the risk of perceptibility of the light emitting surface is simultaneously reduced. A vehicle having such an outside door handle should equally be provided.

This object is respectively satisfied with respect to the subject matter of the respective independent claim. Advantageous embodiments of the invention can be seen from the respective independent claims, from the description and from the drawing.

An outside door handle in accordance with the invention, in particular for a motor vehicle, is equipped with a handle body having an outer contour, with a light source received by the handle body for a front area lighting and/or for a door handle cup lighting, and with a diffuser, wherein the diffuser for scattering the light irradiated from the light source into diffuse light is inwardly arranged in the handle body at a spacing from its outer contour.

It is accordingly the underlying idea of the invention to arrange the diffuser inwardly in the handle body to thereby reduce the risk of perceptibility of light emitting surfaces of the lighting. The inward arrangement of the diffuser in particular enables its suitable covering by adjacent handle body sections. The risk of a direct visibility of light emitting surfaces from positions of view of at least 1 m above the respective ground below the vehicle and at a distance of 10 m from the vehicle is reduced in this manner. The use of a diffuser simultaneously ensures a homogeneous light emission with respect to intensity and color so that an appealing lighting result can be achieved.

In accordance with a preferred embodiment, the diffuser has a roughened surface and/or has scattering centers included in its volume, whereby the generation of diffuse light can be effected reliably and with only a small apparatus effort or material use.

In a further preferred manner, the diffuser is part of an optical system that is inwardly arranged in the handle body at a spacing from its outer contour to change the irradiation characteristics of the light irradiated from the light source. Irradiation characteristics are here in particular understood as the shape, size and/or direction of the light propagation or of the light cone and/or the degree of diffusion of the light. In contrast, in the sense of the present invention, the purely parallel displacement of light waves, for instance through transparent covers without a lens function or diaphragm function, should not be understood as a change of irradiation characteristics. Accordingly, in the sense of the present invention, components that generate a purely parallel displacement of light waves, such as transparent covers without a lens function or diaphragm function, are not considered as belonging to the optical system.

The irradiation characteristics can be influenced in a suitable manner by the arrangement of an optical system in the interior of the handle body without the optical components required for this purpose being perceptible outside the vehicle from typical points of view. In this respect, in particular all the components of the optical system that are configured to change the irradiation characteristics of the light irradiated from the light source are inwardly arranged in the handle body at a spacing from its outer contour. The outer contour of the handle body can be formed independently of the diffuser and/or of the optical system. The outer contour can primarily be shaped in this manner with respect to the haptic requirements and to produce an appealing appearance without the functionality of the lighting being impaired.

In a particularly advantageous manner, the outer contour of the handle body can be formed free of components and/or sections for changing the irradiation characteristics of the light irradiated from the light source. In this respect, the components and/or sections forming the outer contour of the handle body are preferably free of lens properties and/or diaphragm properties and/or light diffusion properties. The risk of perceptibility of light emitting surfaces is further reduced in this manner.

In accordance with a further preferred embodiment, the handle body has a light emitting surface, in particular for the emission of the light from the handle body that is irradiated from the light source and/or that is changed in its irradiation characteristics by the optical system. The light source and/or the diffuser and/or the total optical system can be arranged adjacent to or in alignment with the light emitting opening to ensure a suitable or unimpeded light emission from the handle body, with the arrangement of the components in the interior of the handle body ensuring the provision of the respective optical functions.

It can furthermore be of advantage if the handle body has a light emitting element to conduct the light from the handle body that is irradiated by the light source and/or that is changed in its irradiation characteristics by the optical system. Such a light emitting element can in particular have a suitable light emitting surface that ensures a reduced risk of perceptibility by an observer due to the property of the light emitting surface. For this purpose, the light emitting element can preferably be formed free of lens properties and/or light diffusion properties. The perceptibility of such a light emitting element having a light emitting surface formed thereat is reduced, for example, in comparison with a roughened light emitting element or with a light emitting element configured as a converging lens. In a preferred manner, the light emitting element here comprises a transparent material, in particular a plastic material, that can be manufactured at low production costs.

In accordance with a further advantageous embodiment, the handle body and/or the outer contour of the handle body is/are formed by at least one handle plate, preferably by a plurality of handle plates. The assembly of the total outside door handle can hereby be simplified.

The light emitting surface is preferably formed in a handle plate or by marginal regions of adjacent handle plates. The light emitting element here can be arranged in the light emitting opening and/or the light emitting opening can be at least approximately completely filled by the light emitting element. The inner space of the handle body can in this manner be closed or suitably covered so that the components arranged in the interior space can be protected from environmental influences.

The light emitting element can sectionally form the outer contour of the handle body. Despite the provision of lighting having a corresponding light emitting opening, an uninterrupted or step-free outer contour that is approximately homogeneous in shape can be provided in this manner. For this purpose, the light emitting element can terminate substantially flush and/or step-free with at least one of the handle plates or also with a plurality of handle plates. The outer contour of the total handle body can be substantially unimpaired by the light emitting surface and/or the extent of the outer contour can be substantially unchanged by the transition between the light emitting element and at least one of the handle plates. The extent of the outer contour sections formed by the light emitting element can equally be integrated in adjacent outer contour sections that are in particular formed by at least one handle plate. An appealing appearance and good haptic properties of the outside door handle can hereby be achieved.

A lens, in particular a converging lens, is further preferably formed between the diffuser and the light source and is even further preferably formed as part of the optical system. Bundles of the light beams and thus a focused illumination of respective desired illumination regions can, for example, be achieved by such a lens.

It can furthermore be of advantage if the diffuser and the light emitting element are formed as contiguous and/or in one piece, whereby both the production and the assembly can be simplified. Furthermore, an intermediate space can be formed between the diffuser and the light emitting element and is in particular sealed, preferably by a cover. The risk of impairments of the optical elements arranged in the handle interior and of the light source is reduced by such a sealing of the intermediate space. The cover for sealing the intermediate space can particularly preferably be inwardly arranged in the handle body, whereby the sealing in the handle interior is also protected.

In accordance with a preferred embodiment, the light source is formed as an LED and/or is arranged on a circuit board. This can be effected at only small costs and ensures a high degree of lighting security. In this respect, the circuit board can be embedded in a compound and/or can be covered by a protective film, preferably by a two-component polyurethane lacquer. The circuit board can hereby be suitably protected from external influences and its long service life can be increased.

It can furthermore be of advantage if a support structure is received in the handle body that is configured to support the diffuser and/or the light source and/or the lens and/or the light emitting element. The assembly is hereby facilitated and the permanently correct seat of the respective components is ensured. In this respect, the support structure can be formed as contiguous and/or in one piece with the diffuser and/or with the light emitting element and/or can have support surfaces to support the lens and/or the circuit board with the light source arranged thereon.

In accordance with a further aspect of the present invention, an outside door handle, in particular for a motor vehicle, is equipped with a handle body having an outer contour, with a light source received by the handle body for a front field lighting and/or a handle cup lighting, and with an optical system that is inwardly arranged in the handle body at a spacing from its outer contour to change the irradiation characteristics of the light irradiated from the light source. Such an outside door handle can preferably also be equipped in accordance with the above-described details.

As already presented, radiation characteristics are here in particular understood as the shape, size and/or direction of the light propagation or of the light cone and/or the degree of diffusion of the light. In the sense of the present invention, the purely parallel displacement of light waves, for instance by transparent covers without a lens function, should accordingly not be understood as a change of irradiation characteristics. Components that generate a purely parallel displacement of light waves, such as transparent covers without a lens function, are therefore not considered as belonging to the optical system in accordance with the invention.

As already presented above, the irradiation characteristics can be influenced in a suitable manner by the arrangement of an optical system in the interior of the handle body without the optical components required for this purpose being perceptible outside the vehicle from usual points of view. All the components of the optical system that are configured to change the irradiation characteristics of the light irradiated from the light source are accordingly preferably inwardly arranged in the handle body at a spacing from its outer contour. The outer contour of the handle body can be formed independently of the optical system. The outer contour can hereby primarily be shaped with respect to haptic demands and with respect to an appealing appearance without the functionality of the lighting being impaired.

A yet further aspect of the invention relates to a motor vehicle, in particular to a passenger car, having at least one door and one outside door handle as described above arranged at said door.

In a preferred manner, the light emitting opening and/or the light emitting element faces/face a handle cup of the vehicle door and/or a ground below the vehicle, in particular a road. The operating friendliness of the vehicle can hereby be improved.

In accordance with a preferred embodiment of the vehicle, the diffuser and/or components of the optical system that are configured to change the irradiation characteristics of the light irradiated from the light source, is/are arranged in a covered manner, preferably covered by a handle plate section, starting from a point of view that is located at a distance of at least 10 m from the outside door handle and at a height of at least 1 m above the ground below the vehicle, in particular the road. The risk of perceptibility of light emitting surfaces starting from typical points of view outside the vehicle is hereby reduced and the observance of legal provisions on external vehicle lighting is promoted.

The invention will be described in the following purely by way of example with reference to the enclosed drawing and to a possible embodiment.

FIG. 4 is a schematic side view of a lighting device of the outside door handle of FIGS. 1 to 3.

Figure 1:
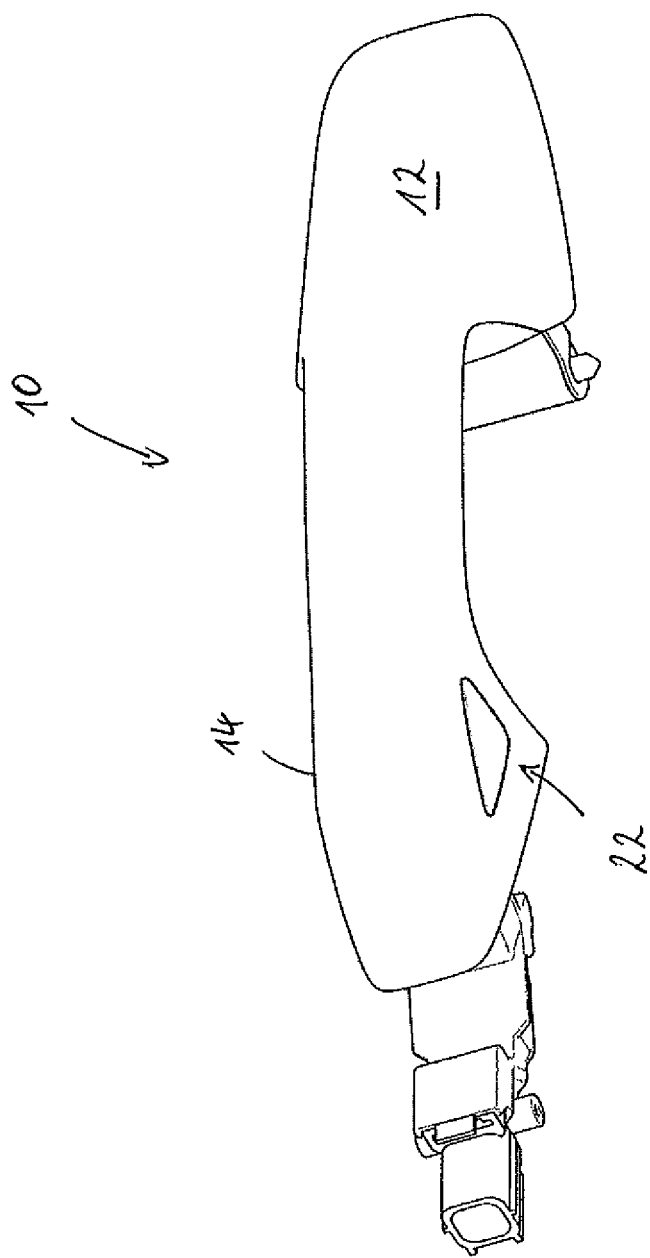
FIG. 1 is a perspective view of an outside door handle in accordance with the invention.
Figure 2:
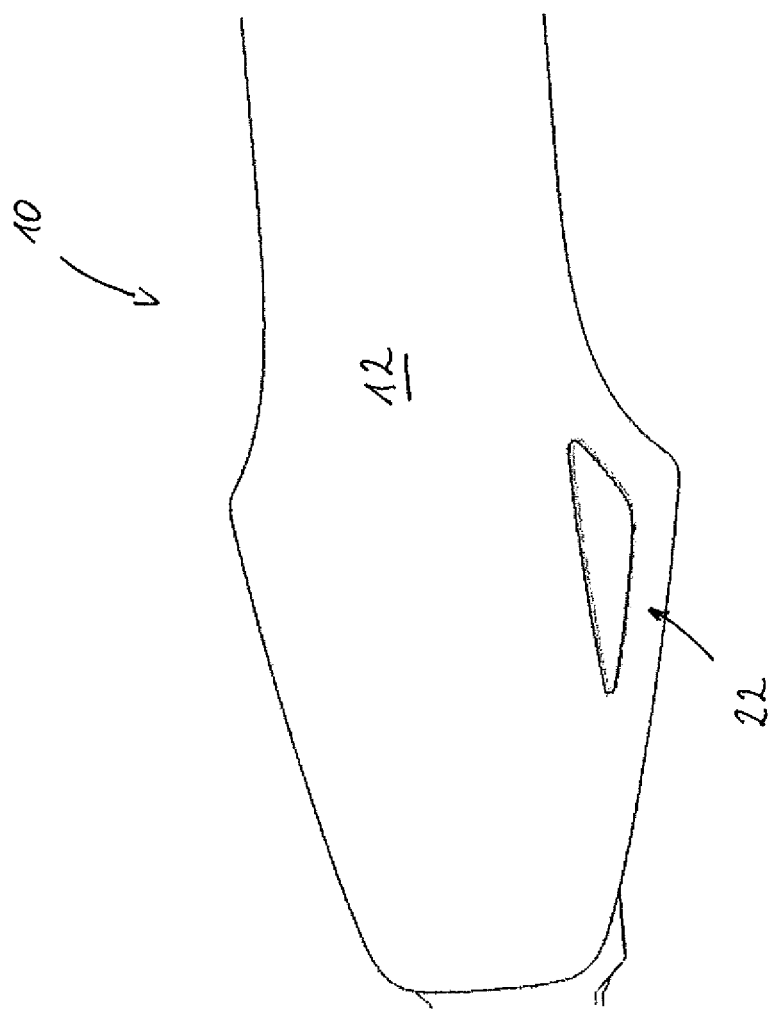
FIG. 2 is a lateral detailed view of the outside door handle of FIG. 1 with a light emitting opening.

An outside door handle 10 for a motor vehicle, not shown here, is shown in a perspective view in FIG. 1. FIG. 2 shows a lateral detailed view of the outside door handle. The outside door handle 10 has a handle body 12 having an outer contour 14. As can be seen from the schematic sectional representation of the outside door handle 10 shown in FIG. 3, a light source 16 and a diffuser 18 for a front field lighting and/or for a handle cup lighting are received in the handle body 10. The light source 16 and the diffuser 18 form a part of a lighting device 20 that is shown in a schematic side view in FIG. 4.

The diffuser 18 is inwardly arranged in the handle body 12 at a spacing from its outer contour to scatter the light irradiated from the light source 14 into diffuse light. The diffuser 18 can accordingly form part of an optical system that is inwardly arranged in the handle body 12 at a spacing from its outer contour 14 to change the irradiation characteristics of the light irradiated from the light source. The outer contour 14 of the handle body 12 is in this respect formed independently of the diffuser 16 and/or of the optical system. This reduces the risk of perceptibility of the diffuser 18 or of further components configured to change the irradiation characteristics from a position of view outside the vehicle.

The handle body 12 further has a light emitting opening 22 through which the light can be emitted from the handle body 12 that is irradiated from the light source 16 and/or that is changed in its irradiation characteristics by the diffuser 18 or by further components of an optical system. A light emitting element 24 for conducting the light from the handle body that is irradiated from the light source 16 and/or that is changed in its irradiation characteristics by the diffuser 18 or by the optical system is arranged in the light emitting opening 22. The light emitting element 24 is in particular free of lens properties and/or light diffusion properties and is formed from a transparent material.

At the same time, the light emitting element 24 sectionally forms the outer contour 14 of the handle body 12. It is hereby ensured that the outer contour 14 of the handle body 12 is free of components and/or of material sections for changing the irradiation characteristics of the light irradiated from the light source 16 since the light emitting element 24 neither produces a diffusion of the irradiated light nor provides a lens functionality. At most a parallel displacement of the light takes place by the light emitting element 24 due to refraction at the surfaces, which is, however, not considered as a change of the irradiation characteristics in the sense of the present invention.

The handle body 12 and/or the outer contour 14 of the handle body 12 can be formed by at least one handle plate 26 in which the light emitting opening 22 is also formed. The light emitting element 24 terminates substantially flush and/or step-free with the handle plate 26 defining the light emitting opening 22. The outer contour 14 remains substantially impaired by the arrangement of the light emitting element 24 in the light emitting opening 22 or the extent of the outer contour 14 remains substantially unchanged by the transition between the light emitting element 24 and the respective adjacent handle plate 26.

Figure 3:
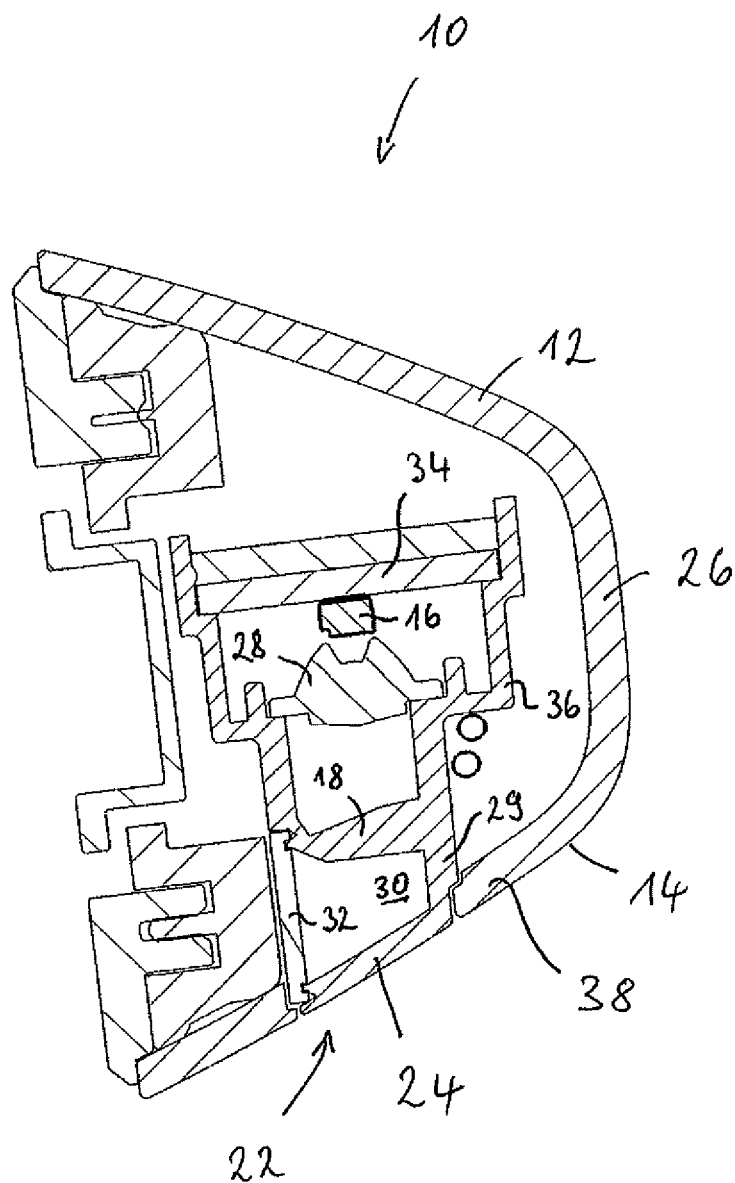
FIG. 3 is a schematic cross-sectional representation of the outside door handle of FIGS. 1 and 2.

As further results from FIG. 3, a lens 28, that can in particular be configured as a converging lens, is arranged between the diffuser 18 and the light source 16. The lens is part of the above-mentioned optical system and is thus also part of the lighting device 20.

The lighting device 20 can thus comprise the light source 16, the diffuser 18, the lens 28, and the light emitting element 24. In contrast, in the present embodiment in accordance with the invention, the optical system is only formed by the diffuser 18 and by the lens 28, whereas in particular the light emitting element 24 is not to be considered as a part of the optical system.

The diffuser 18 and the light emitting element 24 can be formed as contiguous and/or in one piece, in particular connected to one another by the connection section 29. Furthermore, an intermediate space 30 that can preferably be sealed by a cover 32 is formed between the diffuser 18 and the light emitting element 24. The sealing by the cover 32 can be carried out by means of ultrasound welding. The cover 32 here can be at least sectionally welded to the light emitting element 24. As results from FIG. 3, the cover 32 is also inwardly arranged in the handle body 12. It can be seen in FIG. 4 that one of the outer edges of the cover 32, follows the outer contour of the light emitting element 24 and thus the outer contour 14 of the handle body 12, in particular in the connection region with the light emitting element 24.

The light source 16 is preferably formed as an LED and is arranged on a circuit board 34 that can in particular be embedded in a compound and/or covered by a protective film. The compound or the protective film can, for example, be a two-component polyurethane lacquer.

Finally, a support structure 36 that is configured to support the diffuser 18, the light source 16, the lens 28, and the light emitting element 24 is received in the handle body 12. In this respect, the support structure 36 can be formed as contiguous and/or in one piece with the diffuser 18 and/or the light emitting element 24. Finally, support surfaces for supporting the lens 28 and/or the circuit board 34 with the light source 16 arranged thereon can be provided at the support structure 36.

The light emitting opening 22 and/or the light emitting element 24 face a ground below the vehicle, not shown here, in particular a road, in a position of the outside door handle 10 mounted at the vehicle or at a vehicle door of the respective vehicle. In such a fastening position and/or fastening orientation of the outside door handle, the diffuser 18 can be covered starting from a point of view that is located at a distance of at least 10 m from the outside door handle 12 and at a height of at least 1 m above the ground beneath the vehicle, in particular the road. The diffuser 18 is preferably arranged covered by a handle plate section 38 from such a position of view. All the further components of an optical system that are configured to change the irradiation characteristics of the light irradiated from the light source 16 can equally also be arranged covered by a handle plate section 38 from a position of view explained above. The handle plate section 38 is in particular adjacent to the light emitting opening 22 and/or to the light emitting element 24.

REFERENCE NUMERAL LIST 10 outside door handle
12 handle body
14 outer contour
16 light source
18 diffuser
20 lighting device
22 light emitting opening
24 light emitting element
26 handle plate
28 lens
29 connection section 30 intermediate space
32 cover
34 circuit board
36 support structure
38 handle plate section

The invention claimed is:

1. An outside door handle, for a motor vehicle, the outside door handle having:
a handle body with an outer contour,
a light source within the handle body, and
a diffuser within the handle body located between the light source and the outer contour and spaced from its the outer contour, whereby the diffuser scatters light irradiated by the light source into diffuse light and the diffuse light illuminates at least one of an area in front of the motor vehicle and a door handle cup.

2. The outside door handle in accordance with claim 1, wherein the diffuser has at least one of a roughened surface and scattering centers included in its volume.

3. The outside door handle in accordance with claim 1, wherein the diffuser is part of an optical system that is inwardly arranged in the handle body at a spacing from the outer contour for changing irradiation characteristics of the light irradiated from the light source.

4. The outside door handle in accordance with claim 3, wherein all components of the optical system configured for changing the irradiation characteristics of the light irradiated from the light source are inwardly arranged in the handle body at a spacing from the outer contour.

5. The outside door handle in accordance with claim 1, wherein the outer contour of the handle body is formed independently of at least one of the diffuser and the optical system.

6. The outside door handle in accordance with claim 1, wherein the outer contour of the handle body is free of components and/or sections for changing irradiation characteristics of the light irradiated from the light source.

7. The outside door handle in accordance with claim 6, wherein the components and/or sections forming the outer contour of the handle body are free of at least one of lens properties, diaphragm properties and light diffusion properties.

8. The outside door handle in accordance with claim 1, wherein the handle body has a light emitting opening.

9. The outside door handle in accordance with claim 8, wherein the light emitting opening is configured for the emission of the light from the light body that is irradiated from the light source and/or that is changed in its irradiation characteristics by the optical system.

10. The outside door handle in accordance with claim 9, wherein the light emitting opening is configured for the emission of the light from the light body that is irradiated from the light source and/or that is changed in its irradiation characteristics in particular by the diffuser.

11. The outside door handle in accordance with claim 1, wherein the handle body has a light emitting element for conducting the light from the handle body that is irradiated from the light source and/or that is changed in its irradiation characteristics by the optical system.

12. The outside door handle in accordance with claim 11, wherein the light emitting element is free of lens properties and/or of light diffusion properties.

13. The outside door handle in accordance with claim 1, wherein at least one of the handle body and the outer contour of the handle body is formed by at least one handle plate.

14. The outside door handle in accordance with claim 13, wherein the handle body has a light emitting opening, with the light emitting opening being formed in a handle plate or being defined by marginal regions of adjacent handle plates, and/or with the light emitting element being arranged in the light emitting opening and/or at least approximately fully filling the light emitting opening, and/or with the light emitting element sectionally forming the outer contour of the handle body.

15. The outside door handle in accordance with claim 13, wherein the light emitting element terminates at least substantially flush and/or step-free with one handle plate, one or more handle plates or both handle plates if only two handles are provided, and/or with the outer contour of the total handle body being substantially unimpaired by the light emitting element, and/or with the extent of the outer contour being substantially unchanged by the transition between the light emitting element and at least one of the handle plates, and/or with the extent of the outer contour sections formed by the light emitting element integrating into adjacent outer contour sections.

16. The outside door handle in accordance with claim 1, wherein a lens is arranged between the diffuser and the light source, and/or with the diffuser and the light emitting element being formed as at least one of contiguous and in one piece.

17. The outside door handle in accordance with claim 16, further comprising an intermediate space formed between the diffuser and the light emitting element.

18. The outside door handle in accordance with claim 1, wherein the light source is formed as an LED and/or is arranged on a circuit board and/or is covered by a protective film.

19. The outside door handle in accordance with claim 1, wherein a support structure is received in the handle body and is configured to support at least one of the diffuser, the light source, the lens and the light emitting element, with the support structure being formed as at least one of contiguous and in one piece with at least one of the diffuser and the light emitting element, and/or with the support structure having support surfaces for supporting at least one of the lens and the circuit board with the light source arranged thereon.

20. An outside door handle having:
a handle body with an outer contour,
a light source within the handle body, and
an optical system within the handle body located between the light source and the outer contour and spaced from the outer contour, the optical system configured to change irradiation characteristics of light irradiated from the light source.

21. A motor vehicle having at least one door and one outside door handle affixed to the door, the outside door handle having:
a handle body with an outer contour,
a light source within the handle body, and
both a diffuser and an optical system located between the light source and the outer contour within the handle body and spaced from the outer contour, the diffusor configured to scatter light irradiated by the light source into diffuse light and the optical system configured to change the irradiation characteristics of the light irradiated from the light source, the diffuse light illuminating at least one of an area in front of the motor vehicle and a door handle cup.

22. The motor vehicle in accordance with claim 21, wherein at least one of the light emitting opening and the light emitting element faces at least one of a handle cup of the vehicle door and a ground below the vehicle.

23. The motor vehicle in accordance with claim 21, wherein the diffuser and/or components of the optical system that are configured to change irradiation characteristics of the light irradiated from the light source is/are arranged in a covered manner.

24. The motor vehicle in accordance with claim 23, wherein the diffuser and/or the components of the optical system are covered by a handle plate section, starting from a point of view that is located at a distance of at least 10 m from the outside door handle and at a height of at least 1 m above the ground below the vehicle.

* * * * *